Aug. 9, 1966  R. CATU  3,265,969
HIGH VOLTAGE PROBE APPARATUS WITH A PLURALITY OF DISCHARGE TUBE
ISOLATING SPARK GAPS THEREIN
Filed April 17, 1961  3 Sheets-Sheet 1
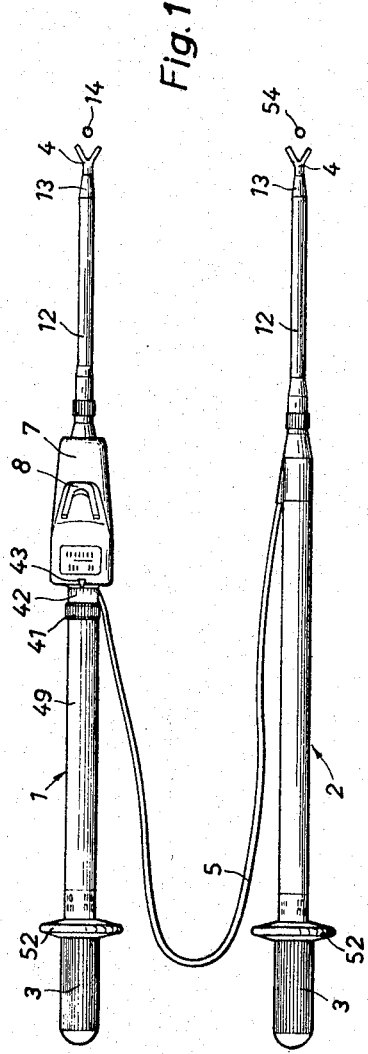
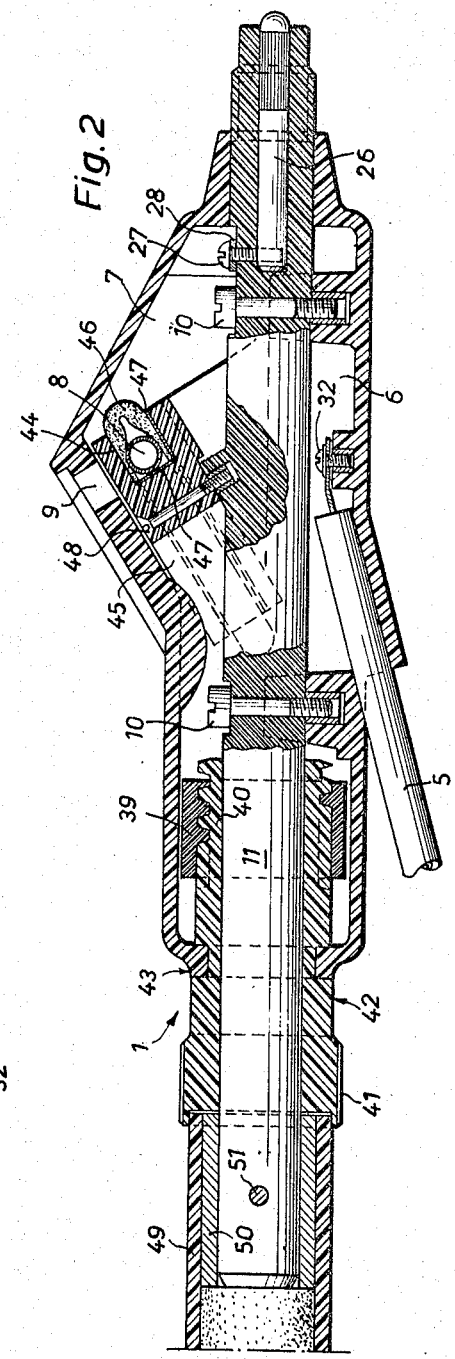
INVENTOR
ROBERT CATU
BY Wenderoth, Lind & Ponack
ATTORNEYS

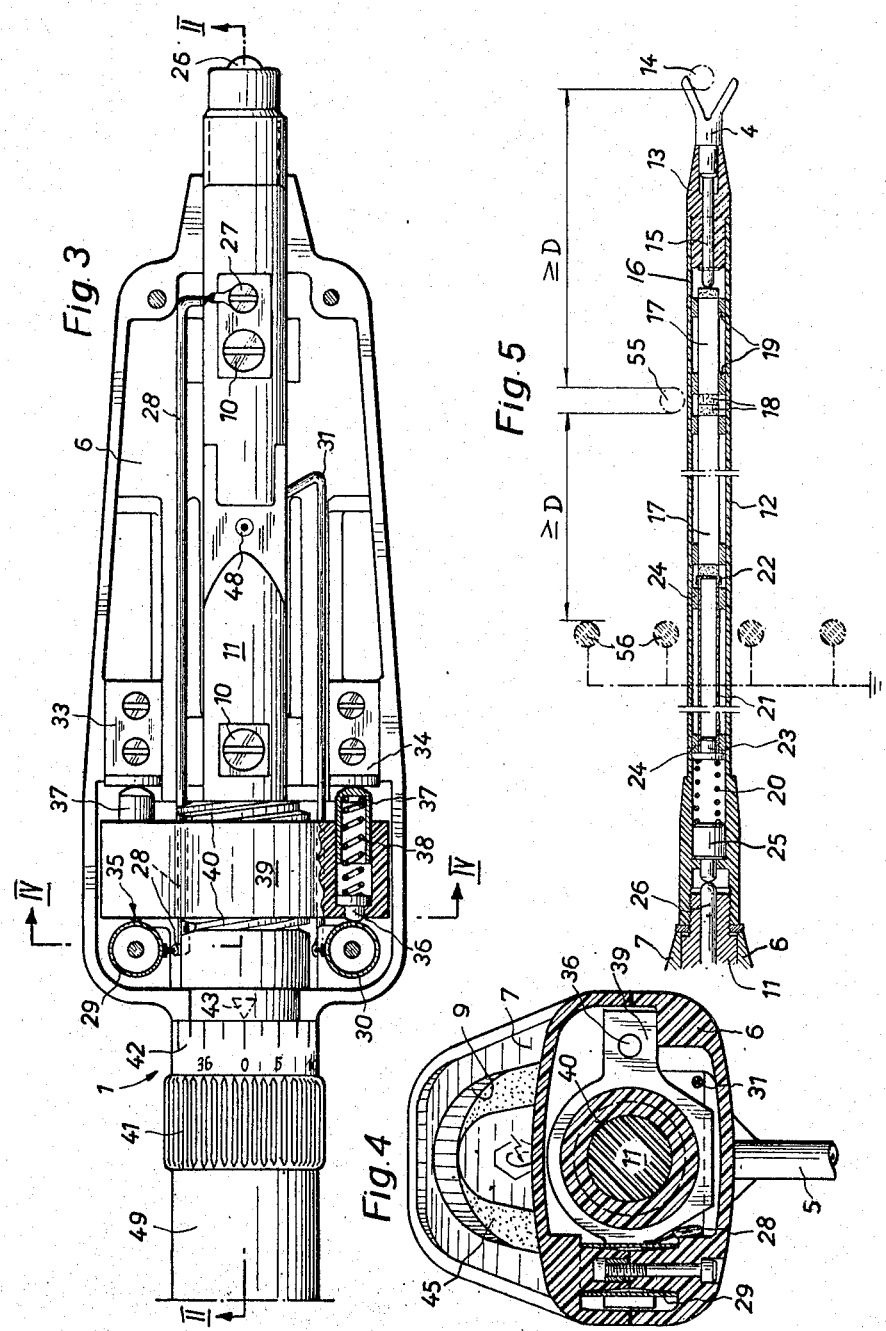

Aug. 9, 1966  R. CATU  3,265,969
HIGH VOLTAGE PROBE APPARATUS WITH A PLURALITY OF DISCHARGE TUBE
ISOLATING SPARK GAPS THEREIN
Filed April 17, 1961  3 Sheets-Sheet 3

INVENTOR
ROBERT CATU
ATTORNEYS

United States Patent Office 3,265,969
Patented August 9, 1966

3,265,969
HIGH VOLTAGE PROBE APPARATUS WITH A PLURALITY OF DISCHARGE TUBE ISOLATING SPARK GAPS THEREIN
Robert Catu, Zurich, Switzerland, assignor to IPA Internationale Patent- und Lizenzanstalt, Vaduz, Liechtenstein
Filed Apr. 17, 1961, Ser. No. 103,559
Claims priority, application Switzerland, Apr. 19, 1960, 4,338/60; May 3, 1960, 5,049/60, 5,050/60; France, May 17, 1960, 827,380
5 Claims. (Cl. 324—72.5)

The present invention relates to an electric voltage detecting apparatus for detecting in electric installations whether a member such as a terminal or conductor is live, that is, under voltage with reference to a reference potential which may be either the momentary potential of another member of the installation or, for example, the potential of the earth or of some earthed body.

More particularly, the said invention relates to a voltage detecting apparatus of the type comprising, in series connection, a contact member adapted to be applied to the first-mentioned member of the installation, a discharge tube, and a member adapted to be brought to the said reference potential.

The voltage detecting apparatus may be a bipolar apparatus in which this member adapted to be brought to the said reference potential is another contact member which is movable with reference to the first-mentioned contact member and is adapted to be brought into contact, for example, with the said other member of the installation, or it may be a unipolar apparatus in which the member which is adapted to be brought to the said reference potential is an armature which is destined for capacitive cooperation with the ground or with an earthed body such as the hand of the user which holds the apparatus, or a structural element supporting the installation, etc.

Bipolar voltage detectors are known which comprise a gas-filled discharge tube mounted in series with protection resistors, the two ends of the circuit, carried by insulating rods, being brought into contact with the two points of the installation of which it is desired to know whether there is a potential difference between them.

This kind of voltage detectors has at least two drawbacks.

Firstly, their correct operation requires that rather accurate relations be observed between the voltage under which they are to work and the values of the various electric elements such as the resistance of resistors and the like, which they comprise. Therefore, these voltage detectors are constructed to operate under a predetermined voltage and they are not easily adaptable to different operating conditions.

Secondly, the existence of a certain capacity between the conducting parts of the apparatus and the earth (or the neighbouring earthed parts) results in that, when two poles or contact members of the apparatus are in contact with two points of equal potential but having a high alternative voltage with reference to earth, a capacitive current may arise between the apparatus and the earth which though very small is nevertheless sufficient for producing in the tube small luminous discharges. Under these conditions, the user cannot be absolutely certain that the two points to which the contact member of the apparatus are applied really are at the same potential.

The present invention has for one of its objects to provide a voltage detecting apparatus comprising means for adapting it to various operating voltages. Reversely, the apparatus can then also serve, to a certain extent, for indicating approximately the order of the voltage of a conductor, terminal or other member of the electric installation which is contacted, in an unipolar voltage detector, by the only contact member, and in a bipolar voltage detector, by one of the two contact members which the detector comprises.

The present invention also has for its object to provide means for diminishing or suppressing the small luminous discharge which is due to the said capacity current in the known bipolar voltage detectors.

A further object of the invention is to provide means for enabling the voltage detecting apparatus to be used for detecting the live or dead condition of conductors and the like which are protected by walls, gratings or the like having no sufficiently large aperture for either introducing therethrough that portion of the apparatus which comprises the discharge tube, or for observing the said tube through these apertures where it is necessary to introduce that part of the apparatus through them in order to apply the contact members of the voltage detecting apparatus to the respective conductors of the installation.

Still another object of the invention, especially in view of the conditions described in the preceding paragraph, is to provide means for ensuring the safety of the user and of the material wherever a defect or perforation of the outer insulating parts of the apparatus would result in bringing accidentally certain inner members of the apparatus into contact either with the body of the user, or with parts of the installation which are at a different potential.

Further objects and advantages of the invention will appear from the description, now to follow, of a preferred embodiment of the invention which is shown by way of example in the accompanying drawings.

In these drawings:

FIG. 1 is a general view of a bipolar voltage detecting apparatus;

FIG. 2 is an axial section, on the line II—II of FIG. 3 and at a larger scale than FIG. 1, of the middle portion of one of the two main components of the apparatus;

FIG. 3 is a plan view, at the same scale as FIG. 2, of the said middle portion of that main component, with the cover removed and a detail shown in section;

FIG. 4 is a cross-section on line IV—IV of FIG. 3, at the same scale as the latter;

FIG. 5 is an axial section, at a smaller scale, of the forward portion of any one of the said two main components;

Figures 6, 7, 8:
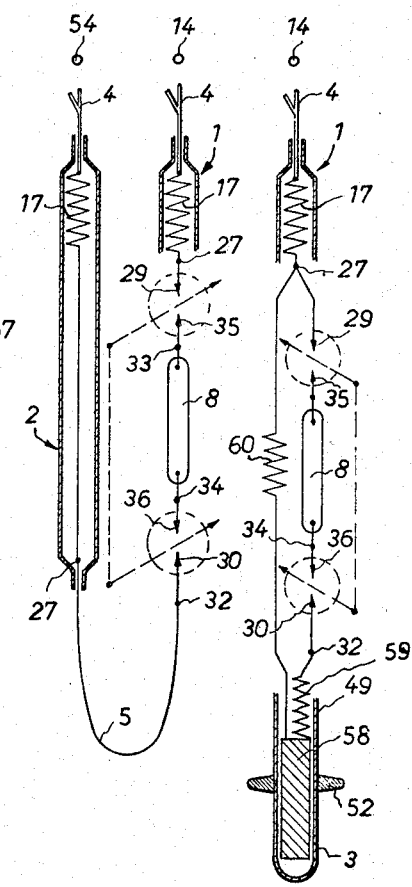
FIG. 6 is a schematic wiring diagram of the apparatus shown in FIGS. 1 to 5.
FIG. 7 is a schematic wiring diagram of an alternative embodiment of the apparatus.
FIG. 8 is a similar wiring diagram showing the application of the invention to a unipolar voltage detecting apparatus.

The voltage detecting apparatus shown in FIGS. 1 to 6 of the drawings is a bipolar apparatus comprising two main components 1 and 2 in the shape of rods each provided with a handle 3 at the rear and having each, at its front end, a contact member 4 for establishing contact between the respective component and a conductor 14 which is one of the two conductors between which it is desired to ascertain whether there is a live electric voltage. The two components 1 and 2 are connected to each other by a flexible insulated cable 5. The component 1 comprises a housing shown in detail in FIGS. 2, 3 and 4, comprising a bottom 6 and a cover 7 both made from insulating material, from which the cable 5 issues and in which are lodged a luminescent discharge tube 8 visible through a window 9 and an adjustable spark gap device to be described later on.

The bottom 6 of the housing is fixed by two screws 10 to a cylindrical core 11 around the lower half of which it extends. The portion of the core 11 which emerges to the front from the housing is threaded to carry an extension comprising an outer insulating tube 12 (FIG. 5). Into the front end of tube 12 a head 13 is fitted which carries the metallic contact member 4; this member features a V-shaped fork end for engaging any conductor 14 the voltage condition of which is to be ascertained. As an alternative to that fork, the contact member 4 could comprise a hook for permanently hooking the component 1 to the conductor 14 if desired, or a combination of hook and fork like a boatman's hook. Towards the rear, the contact member 4 comprises a stem 15 at which it is located by means of a circlip 16. The insulating tube 12 contains one or more resistor or capacitor elements such as a series of resistors rods 17, shown in FIG. 5, which are in mutual contact by their ends 18 and laterally supported by means of insulating, resilient rings 19 which maintain them in axial alignment within the tube 12 and protect them from undue shocks. The front end of the foremost resistor rod 17 abuts the stem 15 of the contact member 4 and the rear end of the rearmost resistor rod 17 is acted upon by a spring 20 through a tubular conductor 21 which is fitted in front with a metal cap 22, at the rear with a metal plug 23, and with two centering rings 24, whereby said spring 20 urges forwardly the whole series of resistor rods 17. The spring 20 is seated on a contact plug 25 which it electrically connects to the aforementioned plug 23 fitted to the tubular conductor 21.

The resistance of the rods 17 is important from the safety point of view. It must be considered that in addition to the conductor 14 on which the contact member 4 is to be engaged, the installation may comprise other conductors such as 55 capable of being live, and elements which are connected to earth, for instance a row of rods 56 forming a grate preventing unauthorised access to the conductors 14 and 55 which may be live. The distance between any conductor such as 14 and any other conductor such as 55 between which and the conductor 14 the nominal voltage of the installation may occur, and also the distance between any of the conductors 14 or 55 and any element connected to earth such as 56 is always at least equal to a minimum value D prescribed by safety regulations or standards for any given nominal voltage and therefore readily ascertainable.

In selecting the appropriate minimum value of the resistance of the series of resistor rods 17, various typical incidents may be considered:

First, the contact element 4 being applied to the conductor 14 the voltage condition of which it is desired to ascertain, and this conductor being supposed to be live, there could be a perforation in the wall of the insulating tube 12 at the place where the latter could come into contact with another conductor 55, or with an earthed element 56.

On the other hand, the insulating tube 12 being in bodily contact either with both conductors 14 and 55, or with the conductor 55 and the element 56, while the contact member 4 is not in contact with either of the conductors 14 and 55, perforations could occur in the wall of the said insulating tube 12 simultaneously at both the respective points of contact.

In either instance, short-circuit currents could occur between the contact member 4 and the point of perforation, or between the two points of perforation, respectively. To prevent these currents from damaging the material, the resistance of the series of rods 17 per unit of its length and consequently over any portion of its length which is at least equal to the minimum value D of the distance between conductors between which the nominal voltage is allowed to occur, should be so high that if the nominal voltage were applied either between the end of the contact member 4 and a point of the series of resistor rods 17 the distance of which from that end is at least equal to D, or between any two points of that series of resistor rods separated from each other by that distance D, the intensity of the current which would be generated by that nominal voltage would be smaller than any value capable of causing substantial damages to the material; an appropriate limit value would at any rate be lower than 25 milliamperes and preferably even below 5 milliamperes.

The resistor rods 17, or the single resistor element which might be provided in its place could be constructed in various manners. In the embodiment here shown, these resistor elements are formed by cylindric rods of resistive material. In that case, it is preferable, in order to obtain an apparatus which will be as light and as easy to handle as possible, to give that material a foam-like structure; this can be done by using a formophenolic resin in the liquid state, into which one has incorporated, on one hand, finely powdered graphite to make the material conductive in the desired degree, and on the other hand, an agent which becomes decomposed and frees a gas under the effect of an acid catalyser which is added to the mixture at the moment of casting to cause the resin to harden. In becoming thus decomposed the said agent produces small bubbles of gas which become seized in the hardened mass and impart it the desired foam-like structure.

In an alternative embodiment, an element replacing the series of resistor rods 17 could be formed by a plain conductive layer applied to the inner wall surface of the insulating tube 12. This conductive layer could be constituted by a synthetic resin which is insulating in itself but in which fine particles of a conducting material such as graphite dust or a metal powder are dispersed. There are organic varnishes sold under the German trade name of "Leitlack" which contain a colloidal suspension of conducting particles and which are well suited for this purpose.

Reverting to the emodiment shown in the drawing, the contact plug 25 is, on the other hand, applied by the spring 20 to the front end of a conductor 26 which is molded into the core 11 of the middle portion of the component 1. By a terminal scerw 27 and an insulated wire 28, that conductor 26 is connected to an electrode 29 in the shape of a metal bush which is maintained transversely of the core 11 and on one side of the latter, by a pair of tapering projections extending towards each other on the insides of the bottom 6 and cover 7, respectively, of the housing. On the opposite side of the core 11, a similar electrode 30 is connected by a wire 31 to a terminal screw 32 from which the cable 5 starts towards the other principal component 2 of the apparatus.

The electric connection between electrodes 29 and 30 is through a pair of spark gaps of simultaneously adjustable width and between which the luminescent discharge tube 8 is connected. That tube, of generally horseshoe shape, is connected by means of its input and output wires, respectively, to two terminals 33 and 34, in the shape of corner pieces having one of their faces perpendicular to the axis of the core 11, the terminal 33 facing the electrode 29 and the terminal 34 facing the electrode 30. Permanent connections are made, on one hand between the terminal 33 and an electrode 35 which cooperates with electrode 29, and on the other hand between the terminal 34 and an electrode 36 cooperating with electrode 30, through slidable contact pistons 37 each of which is maintained in contact with the respective terminal 33, 34 by means of a spring 38 interposed between the electrode 35, 36 and the respective contact piston 37.

The electrodes 35 and 36, the contact pistons 37 and the springs 38 are lodged in an insulating block 39 which is guided between the bottom 6 and the cover 7 of the housing in such a manner as to be axially slidable but not rotatable. The insulating block 39 has an axial bore into which is screw-threaded a tubular extension 40 of an annular knob 41. This knob 41 and its extension 40 are rotatable on the core 11 but located against axial displacement by engagement of the edges of the bottom 6 and cover 7 into an annular groove between the knob 41, which is outside the housing, and the threaded extension 40. Thus, the user can displace the block 39 axially by rotating the knob 41 about the axis of the core 11. The knob is provided with a kilovolt scale 42 adapted to cooperate with an index 43 on the cover 7. When the block 39 is thus displaced axially on the core 11, the pistons 37 are maintained in contact with the respective terminals 33 and 34 while the distance between the electrodes forming the two spark gaps, namely, between the electrodes 29 and 35 one one hand, and 30 and 36 on the other hand, are varied simultaneously by the same amounts.

The luminescent discharge tube 8, for example a neon tube, is lodged in a groove 44, of rectangular cross-section, of a saddle-shaped supporting piece 45 made from transparent synthetic resin. In order to direct towards the horseshoe-shaped opening 9 of the cover 7 a large part of the light rays emitted by the tube 8, metal sheets 47 with reflecting surfaces are disposed on the bottom wall and on that of the lateral walls of the groove 44 which is on the side remote from the opening 9.

The discharge tube 8 and the reflecting metal sheets 47 are entirely encased in a mass 46 of insulating and transparent synthetic resin, e.g. a transparent variety of polyester, acrylic or other resin, which is cast into the groove 44 after the tube 8 and the sheets 47 have been inserted in their place. As an example, one can use a styrene-base polyester resin to which a very small quantity of methyl-ethyl-ketone peroxide (registered trademark "Lupersol") has been added as a hardening catalyser. Polymerizing will occur at normal temperature within a few hours or at a slightly higher temperature, e.g. 35° C. The components and their proportions may be selected, and the curing temperature limited, in such a manner that not only a transparent polymerisate is obtained, but also that polymerizing occurs smoothly, without violent reaction, in order to avoid any contraction or dilatation of the material which might produce cracks in the material and impair its transparence. However, it may be found desirable in certain instances to obtain a slightly diminished transparence of the encasing resin in order that very small discharges, such as would be due to mere capacity currents, will not come to the notice of the user.

The encasing of the discharge tube 8 into the mass of resin 46 ensures good mechanical protection of the tube 8 due to the fact that once the resin is hardened, that mass forms a solid and compact body together with the supporting piece 45, the reflecting sheets 47 and the tube 8. Since that body is impermeable to water, the penetration of moisture to the surface of the tube, along which it would facilitate undesirable discharge, is effectively prevented. The said body formed by the resin mass 46 and the parts encased therein is fixed on an inclined surface of the core 11, by means of a screw 48, in such manner that the said body extends about half-way round the core 11 and can well be seen from the rear of the component 1, through the window 9, by the user who holds that component at its handle 3.

The hitherto described parts of the component 1 are connected to the handle 3 by means of a tube 49 made from insulating material and in which the core 11 is fixed at the rear of the knob 41, by means of an intermediate sleeve 50 and a pin 51. The handle 3 is provided with a guard 52 indicating the position in front of which the apparatus should not be touched when in use.

The front and rear portions of the other principal component 2 are similar to those portions of the principal component 1 which are connected in front and at the rear, respectively, of the core 11. Though the component 2 also comprises such a core (not visible in the drawings), this core does only comprise a conductor similar to the conductor 26 of component 1 and a terminal screw similar to screw 27, which parts of the component 2 serve to connect the junction cable 5 between the two components, to the plug 25 of the front portion of component 2. In this component, an insulating sleeve 53 (FIG. 1) takes the place of the bottom 6 and cover 7 of the housing of component 1, which sleeve encloses the said screw and the end of cable 5.

FIG. 6 is the electric wiring diagram of the bipolar voltage detecting apparatus shown in FIGS. 1 to 5.

In order to test by means of this apparatus whether a conductor 14 of an electric plant is live with reference to another conductor 54 which is supposed to have a different phase or polarity or which is earthed, one first adjusts the two spark gaps 29/35 and 30/36 to the nominal voltage of the plant by rotating the knurled knob 41 until the indication of that voltage on the graduation 42 registers with the index 43. Then one applies the contact members 4 of the components 1 and 2, respectively, to the conductors 14 and 54 which are to be tested for the presence of a live voltage between them. If there is a substantial voltage between these conductors, a current will flow from the conductor 14 through the contact element 4 of component 1, resistors 17, tubular conductor 21, plug 23, spring 20, plug 25, conductor 26, terminal screw 27, wire 28, electrodes 36 and 30 of the first spark gap, the corresponding spring 38 and contact piston 37, terminal 33, discharge tube 8, terminal 34, the other contact piston 37 and spring 38, electrodes 36 and 30 of the second spark gap, wire 31 and terminal screw 32 of component 1, the junction cable 5, the parts (not shown) of component 2 which correspond to terminal screw 27 and conductor 26 of component 1, the parts 20, 23, 21, 17 of the front portion of component 2 and finally its contact member 4 to the conductor 54. In passing through the discharge tube 8, this current will light the latter. However, this current will only flow if the voltage from which it proceeds is sufficient to permit discharge through the spark gaps 29/35 and 36/30.

In particular, if the distance between these electrodes is properly adjusted and if the voltage between the conductors 14 and 54 is practically zero, then the alternating voltage between the conductor 14 and the earth will not suffice to produce, by capacity between the junction cable 5 and the earth, a sufficient current for lighting the tube 8. The interruption of the circuit by the spark gaps 29/35 and 36/30 in this case is particularly effective since when there is no discharge through these spark gaps, the discharge tube 8 is electrically connected neither to the conductor 14 and the part of component 1 which is in contact with it, nor to the cable 5 and the component 2. This radically prevents lighting of that tube under the effect of currents which might be due to the capacity of any part of the circuit.

On the other hand, when the voltage between the electrodes 29 and 30 and therefore between the electrodes (not shown) of the discharge tube 8, is sufficient to permit a current to flow, the discharges in the spark gaps 29/35 and 36/30 will produce high frequency oscillations which substantially increase the luminosity of the tube 8.

If desired, one could use the described apparatus for ascertaining at least the order of the value of the voltage between two conductors 14 and 54 of a plant. For this purpose the distance between the electrodes 29 and 35 and between the electrodes 30 and 36 will be adjusted to its maximum by bringing the knob 41 to its angular position corresponding to the highest voltage marked on the graduation 42, and thereafter, the contact elements 4 of the components 1 and 2 will be applied to the conductors 14 and 54, respectively. If the tube 8 does not flash up, the knob 41 shall be set to successive positions corresponding to gradually decreasing voltage values, until the tube 8 becomes lighted. The voltage which is then read on the graduation 42 will give an approximative indication of the voltage between the conductors 14 and 54.

The alternative embodiment schematically represented in FIG. 7 differs from that described with reference to FIGS. 1 to 5 and schematically represented in FIG. 6, by the fact that the first spark gap 29/35 is omitted. Thus, the one end of the discharge tube 8 would be connected directly to the terminal screw 27 of FIGS. 2 and 3 instead of to the terminal 33, which thus could be omitted together with its cooperating contact piston 37 and spring 38, the electrodes 35 and 39, and the wire 28. On the other hand, according to FIG. 7 an additional resistor 57 is connected in parallel with the tube 8, that is, between the terminals 27 and 34 so as to reduce the voltage across that tube and prevent its lighting as long as no substantial current flows in the circuit and especially if such current were produced only between the conductor 14 and the cable 5, due to capacity between the latter and earth, while the conductors 14 and 54 are at the same alternating voltage.

FIG. 8 represents, in a similar schematic manner, a unipolar voltage detecting apparatus for ascertaining whether a conductor 14 is live and what is the order of its potential with respect to earth potential. This appartus comprises a single main component such as the component 1 of the apparatus shown in FIG. 1, the component 2 and the cable 5 being in this case omitted. In their stead, an armature 58 is lodged within the rod 49 and connected to terminal 32 through an appropriate resistor 59. A second connection comprising another resistor 60 is provided in parallel to the circuit of the tube 8 and spark gaps 29/35 and 36/30, between the terminal screw 27 and the armature 58.

This armature 58 cooperates in the manner of a capacitor with the hand of the operator who holds the apparatus by the handle 3 while standing on the ground so that his body is at earth potential. Accordingly, if the contact member 4 is applied to an A.C. conductor 14 which is live, the armature 58 will alternately be charged and discharged simultaneously through the circuit of the discharge tube 8 and the parallel circuit comprising the resistor 60. Due to the latter circuit, however, the current will not jump the spark gaps and pass the discharge tube 8 before the voltage between the conductor 14 and earth exceeds a certain minimum voltage which is adjustable by varying the width of the spark gaps 29/35 and 36/30, as described above with reference to FIGS. 1 to 6.

The resistance values of the resistors 59 and 60 should be high enough to prevent any dangerous discharge from occurring through the body of the user even though the insulation of the armature 58 by the tube 49 were defective.

More particularly, and assuming that the armature 58 extends to the rear beyond guard 52 as schematically indicated in FIG. 8, the joint resistance of such portions of the armature 58 and of each of the resistors 59 and 60 which are comprised between any two points separated from each other by at least the aforesaid distance D and one of which is rearwards of the guard 52, should be such that if the nominal voltage were applied at these points, the resulting current would not exceed a value which can still be considered safe, such as 2.5 milliamperes at the most and more preferably 0.5 milliampere or even less. Then, if the handle 3 of tube 49 happens to be punctured at the point where the user holds it at the rear of the guard 52, and if either the contact member 4 is applied to a live conductor such as 14, or if the tube 49 happens to come into contact with such a conductor and be punctured at the point of such contact (this being prevented by the usual protective measures from being less than the distance D from the guard 52 and operator's hand), then the resulting current passing through the armature and the user's hand and body will be limited to an inoffensive value.

To achieve this purpose, the armature 58 is preferably constructed in one of the manners described above for the construction of the resistors 17 or their equivalents.

I claim:

1. A voltage detecting apparatus comprising a first contact member, a first pair of spaced electrodes forming a first spark gap, a discharge tube, a second pair of spaced electrodes forming a second spark gap, a connecting conductor, and a second contact member all connected in series with each other, said discharge tube being connected between said first and second pairs of electrodes, one electrode of each of the said pairs being displaceable with respect to the other electrode of the respective pair, and means coupled to each pair of electrodes for jointly displacing the displaceable electrodes of the two pairs.

2. A voltage detecting apparatus comprising a contact member, impedance means, a discharge tube, and means for providing a reference potential connected in series with each other, a tubular extension of the apparatus housing said impedance means and carrying said contact member, said impedance means being part of the connection between said contact member and said discharge tube, said impedance means having a resistivity sufficient for limiting to a non-objectionable value the intensity of the current which would be produced through said impedance means by applying between any two points of said impedance means spaced a distance at least equal to the prescribed minimum distance between conductors in plants of the considered nominal voltage, a voltage equal to that nominal voltage.

3. A voltage detecting apparatus as claimed in claim 1 in which the said impedance means comprise a resistor which is an insulating synthetic resin having a foamed structure and having conductive particles distributed therein.

4. A voltage detecting apparatus comprising a first contact member, a first pair of spaced electrodes forming a first spark gap, a discharge tube, a second pair of spaced electrodes forming a second spark gap, said discharge tube being connected between said first and second pair of electrodes, a connecting conductor, and a second contact member all connected in series with each other, one electrode of each of the said pairs being displaceable with respect to the other electrode of the respective pair.

5. A voltage detecting apparatus as claimed in claim 1 in which said means for displacing the displaceable electrodes comprise a common movable member connected to the displaceable electrodes of the two pairs, whereby said displaceable electrodes are moved simultaneously and in the same direction and in the same amount relative to the fixed electrodes of the two pairs.

References Cited by the Examiner

UNITED STATES PATENTS

| 1,370,638 | 3/1921 | Euler et al. | 324—17 XR |
| 1,413,140 | 4/1922 | Sutherlin | 324—17 |
| 2,256,086 | 9/1941 | Guziel | 324—17 |
| 2,482,016 | 9/1949 | McCoy | 324—149 X |
| 2,762,977 | 9/1956 | Krueger | 324—17 X |
| 2,779,919 | 1/1957 | West | 324—72.5 |

FOREIGN PATENTS 543,881  9/1922.  France.

WALTER L. CARLSON, *Primary Examiner.*

LLOYD McCOLLUM, *Examiner.*

G. S. KINDNESS, E. L. STOLARUN,
*Assistant Examiners.*